United States Patent
Kawauchi et al.

(10) Patent No.: US 7,744,275 B2
(45) Date of Patent: Jun. 29, 2010

(54) OPTICAL FIBER TEMPERATURE SENSING DEVICE

(75) Inventors: Hidetaka Kawauchi, Hitachi (JP); Masaki Ogura, Hitachi (JP); Juhyun Yu, Hitachi (JP); Akihiro Hiruta, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 401 days.

(21) Appl. No.: 11/806,230

(22) Filed: May 30, 2007

(65) Prior Publication Data

US 2007/0280329 A1 Dec. 6, 2007

(30) Foreign Application Priority Data

May 31, 2006 (JP) ............... 2006-151576

(51) Int. Cl.
- *G01K 3/00* (2006.01)
- *G01K 11/00* (2006.01)
- *G01K 15/00* (2006.01)
- *G01J 5/00* (2006.01)

(52) U.S. Cl. ............... 374/131; 374/135; 374/121; 374/137; 374/129

(58) Field of Classification Search ............... 374/120, 374/121, 129–132, 134, 137, 159, 161
See application file for complete search history.

(56) References Cited

U.S. PATENT DOCUMENTS

| | | | | |
|---|---|---|---|---|
| 4,714,342 A * | 12/1987 | Jackson et al. | ............... | 356/44 |
| 4,767,219 A * | 8/1988 | Bibby | ............... | 374/123 |
| 4,859,065 A * | 8/1989 | Bibby | ............... | 356/45 |
| 5,102,232 A * | 4/1992 | Tanabe et al. | ............... | 374/131 |
| 5,272,334 A * | 12/1993 | Sai | ............... | 250/227.21 |
| 5,825,804 A * | 10/1998 | Sai | ............... | 374/137 |
| 6,285,446 B1 * | 9/2001 | Farhadiroushan | ............... | 356/35.5 |
| 6,519,387 B1 * | 2/2003 | Sunagawa et al. | ............... | 385/33 |
| 6,606,148 B2 * | 8/2003 | Fredin et al. | ............... | 356/73.1 |
| 6,811,307 B2 * | 11/2004 | Crowe et al. | ............... | 374/131 |
| 7,126,680 B2 * | 10/2006 | Yamate et al. | ............... | 356/73.1 |
| 7,215,416 B2 * | 5/2007 | Yamate et al. | ............... | 356/73.1 |
| 7,237,950 B2 * | 7/2007 | Shioji et al. | ............... | 374/161 |
| 7,350,972 B2 * | 4/2008 | Seebacher et al. | ............... | 374/161 |
| 7,355,163 B2 * | 4/2008 | Watley et al. | ............... | 250/227.14 |
| 7,398,011 B2 * | 7/2008 | Tanaka et al. | ............... | 386/99 |
| 7,585,107 B2 * | 9/2009 | Taverner et al. | ............... | 374/120 |
| 7,628,531 B2 * | 12/2009 | Lee et al. | ............... | 374/1 |

(Continued)

FOREIGN PATENT DOCUMENTS

JP 2577199 11/1996

*Primary Examiner*—Gail Verbitsky
(74) *Attorney, Agent, or Firm*—McGinn IP Law Group, PLLC (57) ABSTRACT

An optical fiber temperature sensing device has a sensor body; a light source housed in the sensor body; a temperature measuring optical fiber disposed outside the sensor body and extended to a temperature measurement site, wherein, when a light is emitted from the light source into the temperature measuring optical fiber, Stokes light intensity and anti-Stokes light intensity of backscattered light generated in the temperature measuring optical fiber are detected to determine a temperature at the temperature measurement site; a reference temperature optical fiber disposed inside the sensor body; and a controller that is operable to control an output of the light source by monitoring Stokes light intensity and anti-Stokes light intensity of backscattered light generated in the reference temperature optical fiber.

12 Claims, 4 Drawing Sheets

U.S. PATENT DOCUMENTS

| | | | |
|---|---|---|---|
| 2005/0140966 A1* | 6/2005 | Yamate et al. | 356/73.1 |
| 2006/0115204 A1* | 6/2006 | Marsh et al. | 385/12 |
| 2007/0127019 A1* | 6/2007 | Zribi et al. | 356/301 |
| 2007/0258087 A1* | 11/2007 | Ogura et al. | 356/301 |
| 2008/0084914 A1* | 4/2008 | Yamamoto et al. | 374/137 |
| 2009/0059996 A1* | 3/2009 | Komeda et al. | 374/161 |
| 2009/0097015 A1* | 4/2009 | Davies et al. | 356/73.1 |

* cited by examiner

FIG.4

OPTICAL FIBER TEMPERATURE SENSING DEVICE

The present application is referenced on Japanese patent application No. 2006-151576, the entire contents of which are incorporated herein by reference.

BACKGROUND OF THE INVENTION

1. Field of the Invention

This invention relates to an optical fiber temperature sensing device that is adapted to measure ambient temperature by detecting Raman scattered light scattered in an optical fiber and, in particular, to an optical fiber temperature sensing device that uses information obtained from the detected Raman scattered light to control output of a light source thereof and detect a malfunction of the device itself.

2. Description of the Related Art

Figure 3:
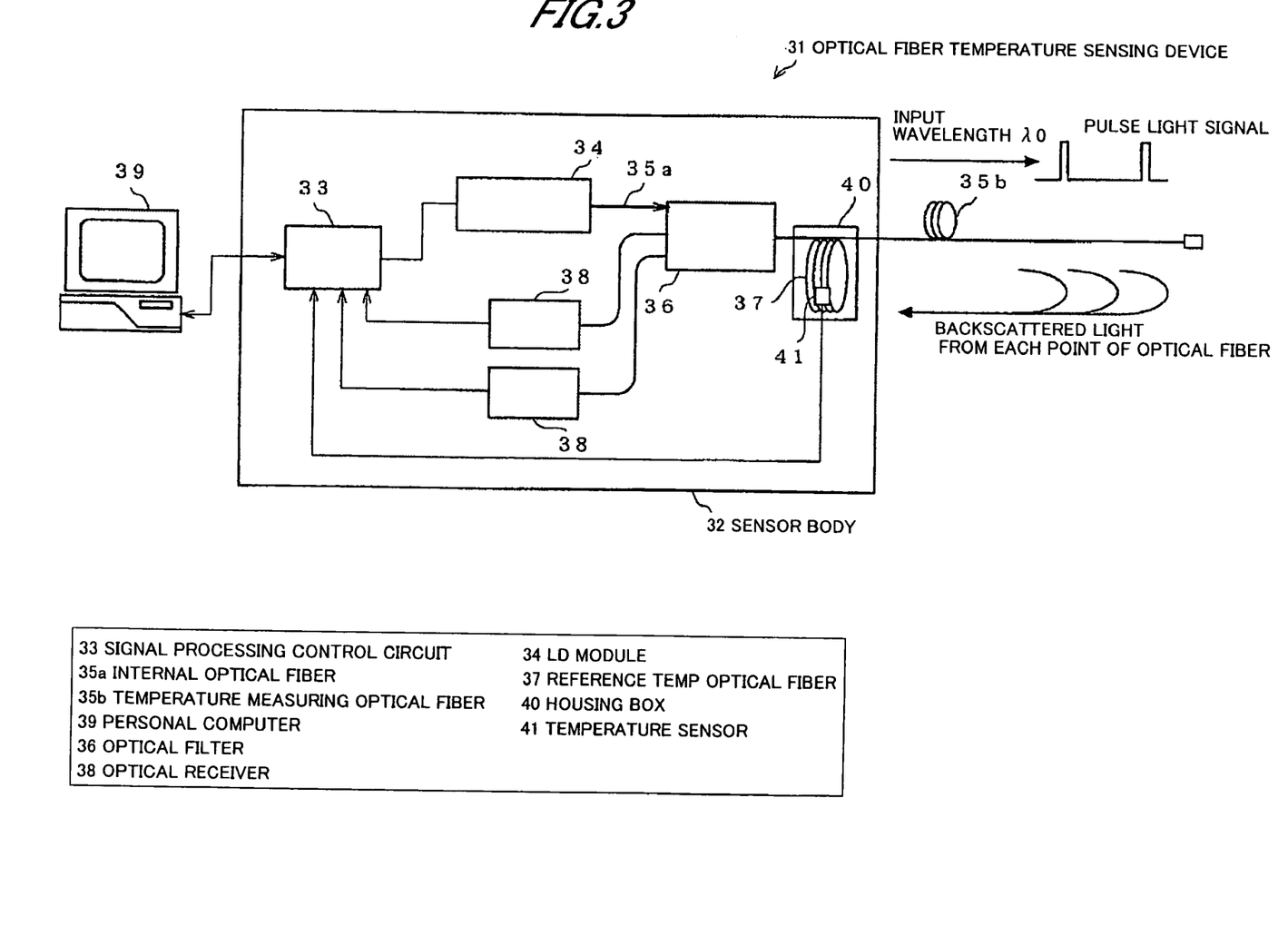
FIG. 3 is a block diagram showing the conventional optical fiber temperature sensing device.

As shown in FIG. 3, a conventional optical fiber temperature sensing device 31 is composed such that a signal processing control circuit 33 of a sensor body 32 generates a pulse signal, an LD (semiconductor laser) module 34 converts the pulse signal into a pulse light signal (with an input wavelength $\lambda_0$), the pulse light signal is inputted through an inside optical fiber 35a to an optical filter 36, and the filtered pulse light signal is outputted through a reference temperature optical fiber 37 to a measuring optical fiber 35b. Hereupon, backscattered light is generated from each point of the measuring optical fiber 35b.

Figure 4:
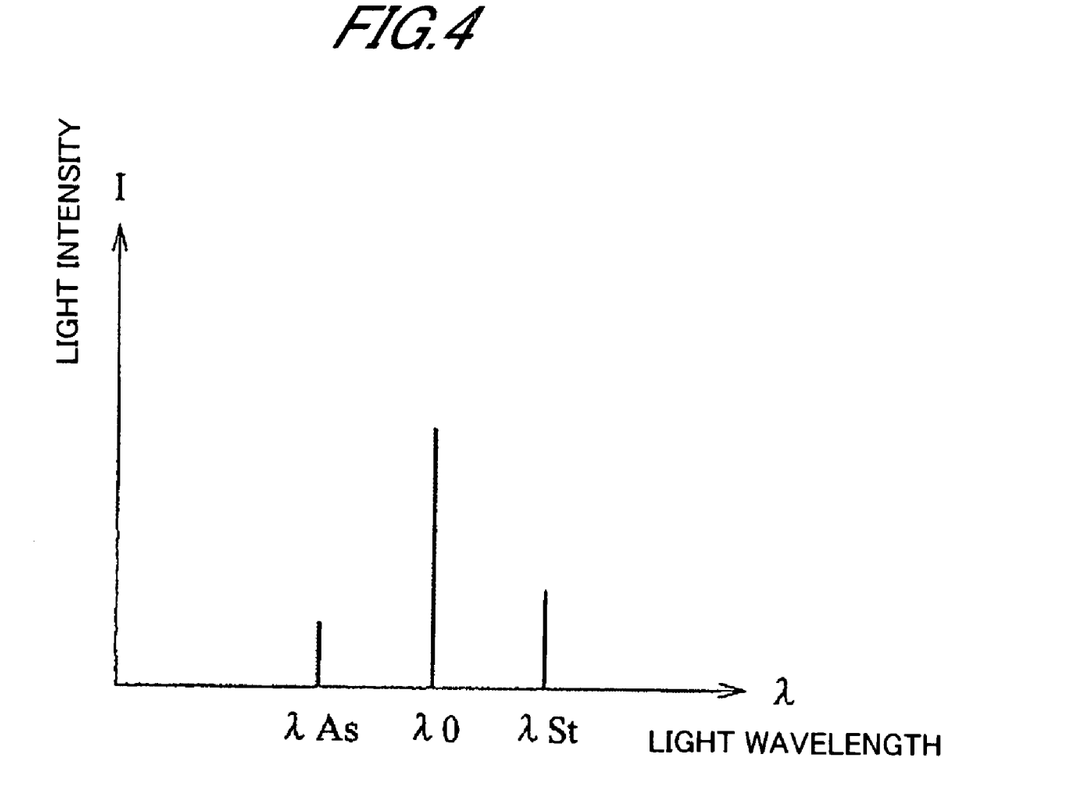
FIG. 4 is a graph showing an intensity spectrum of backscattered lights in optical fiber.

The backscattered light includes Rayleigh scattered light with a transmission wavelength of $\lambda_0$, and Stokes light (herein called "St light") with a wavelength of $\lambda$St and anti-Stokes light (herein called "As light") with a wavelength of $\lambda$As, where the St light and As light compose the Raman scattered light (See FIG. 4).

The St light and the As light are separated from the backscattered light by the optical filter 36, they are each received by optical receivers 38 to be converted into electrical signals, and the signals are then inputted to the signal processing control circuit 33. The signal processing control circuit 33 operates to process the electrical signals to calculate an intensity ratio of the St light and the As light, and to calculate temperature at a measurement site from the intensity ratio. The temperature data calculated is transmitted from the signal processing control circuit 33 to a personal computer 39 to allow the data to be displayed thereon.

The device 31 includes the reference temperature optical fiber 37 housed in an optical fiber housing box 40, and a temperature sensor 41 attached to the reference temperature optical fiber 37. The temperature sensor 41 is connected to the signal processing control circuit 33.

Since the intensity ratio of the St light and the As light is dependent on the ambient temperature, a temperature distribution around the measuring optical fiber 35b can be determined by the measuring the intensity ratio by the optical fiber temperature sensing device 31.

However, an LD used in the LD module 34 changes in output depending on ambient temperature. Therefore, it is necessary to keep the output of the LD constant during the measurement in order to accurately measure the temperature.

It may be assumed that the following methods for keeping the output of the LD constant are applicable to the optical fiber temperature sensing device 31.

(i) To provide the LD module 34 with a monitoring PD to detect a light emitted in the opposite direction to the emission direction of the LD, so that the signal processing control circuit 33 can control the output of the LD to be constant based on the output of the monitoring PD, and (ii) To provide the LD module 34 with a peltiert device having a temperature-adjusting function to control the temperature of the LD to keep the output of the LD constant.

However, if the above methods (i), (ii) are applied to the conventional optical fiber temperature sensing device 31, in case of the method (i), the monitoring LD has to be added to the LD module 34, and in case of the method (ii), the peltiert device has to be added to the LD module 34. Thus, in either case, a problem arises that the whole cost of the optical fiber temperature sensing device 31 increases due to the addition of the device.

Another problem arises that the whole construction of the optical fiber temperature sensing device 31 is complicated when the LD module 34 is provided with the monitoring PD or the peltiert device.

A further problem arises that the structure of the signal processing control circuit 33 is complicated since the signal processing control circuit 33 needs to process signals from the monitor PD or the peltiert device as well as signals for the St light and the As light.

In case of detecting a malfunction of the LD, the monitoring PD will be needed so that the same problems as above can be caused.

Related art to the invention is, e.g., JP-B-2577199.

SUMMARY OF THE INVENTION

It is an object of the invention to provide an optical fiber temperature sensing device that can keep the output of the LD constant without complicating the construction and increasing the manufacturing cost so as to raise the precision of temperature measurement thereof.

(1) According to one embodiment of the invention, an optical fiber temperature sensing device comprises:

A sensor body;

a light source housed in the sensor body;

a temperature measuring optical fiber disposed outside the sensor body and extended to a temperature measurement site, wherein, when a light is emitted from the light source into the temperature measuring optical fiber, Stokes light intensity and anti-Stokes light intensity of backscattered light generated in the temperature measuring optical fiber are detected to determine a temperature at the temperature measurement site;

a reference temperature optical fiber disposed inside the sensor body; and a controller that is operable to control an output of the light source by monitoring Stokes light intensity and anti-Stokes light intensity of backscattered light generated in the reference temperature optical fiber.

In the above embodiment (1), the following modifications and changes can be made.

(i) The controller is operable to control a bias electrical current applied to the light source.

(ii) The controller is operable to detect a malfunction of the device.

(iii) The controller is operable to detect a malfunction of the light source.

(iv) The controller is operable to previously determine reference calculated values from Stokes light intensity and anti-Stokes light intensity of backscattered light generated in the reference temperature optical fiber at least at two arbitrary temperatures, to determine an approximation formula representing a relationship between the reference calculated values and the two arbitrary temperatures, to store the approximation formula in a memory device, to determine a first calculated value from Stokes light intensity and anti-Stokes light intensity of backscattered light generated in the reference temperature optical fiber at an other temperature, to determine a second calculated value at the other temperature by using the approximation formula, and to control the bias electrical current applied to the light source to make the first calculated value equal to the second calculated value.

(v) The controller is operable to previously determine reference calculated values from Stokes light intensity and anti-Stokes light intensity of backscattered light generated in the reference temperature optical fiber at plural temperatures, to store the reference calculated values into a memory device, to determine a first calculated value from Stokes light intensity and anti-Stokes light intensity of backscattered light generated in the reference temperature optical fiber at an arbitrary temperature, to output a second calculated value at the arbitrary temperature from the reference calculated values, and to control the bias electrical current applied to the light source to make the first calculated value equal to the second calculated value.

(2) According to another embodiment of the invention, an optical fiber temperature sensing device comprises:

a sensor body;

a light source housed in the sensor body;

an optical fiber disposed from an inside of the sensor body to a temperature measurement site, to measure a temperature at the temperature measurement site by detecting Stokes light intensity and anti-Stokes light intensity of backscattered light generated in the optical fiber when a light is emitted from the light source into the optical fiber; and a controller to control an output of the light source by monitoring Stokes light intensity and anti-Stokes light intensity of backscattered light generated in the optical fiber.

In the above embodiment (2), the following modifications and changes can be made.

(vi) The controller is operable to control a bias electrical current applied to the light source.

(vii) The controller is operable to detect a malfunction of the device.

(viii) The controller is operable to detect a malfunction of the light source.

(ix) The controller is operable to previously determine reference calculated values from Stokes light intensity and anti-Stokes light intensity of backscattered light generated in the reference temperature optical fiber at least at two arbitrary temperatures, to determine an approximation formula representing a relationship between the reference calculated values and the two arbitrary temperatures, to store the approximation formula in a memory device, to determine a first calculated value from Stokes light intensity and anti-Stokes light intensity of backscattered light generated in the reference temperature optical fiber at an other temperature, to determine a second calculated value at the other temperature by using the approximation formula, and to control the bias electrical current applied to the light source to make the first calculated value equal to the second calculated value.

(x) The controller is operable to previously determine reference calculated values from Stokes light intensity and anti-Stokes light intensity of backscattered light generated in the reference temperature optical fiber at plural temperatures, to store the reference calculated values into a memory device, to determine a first calculated value from Stokes light intensity and anti-Stokes light intensity of backscattered light generated in the reference temperature optical fiber at an arbitrary temperature, to output a second calculated value at the arbitrary temperature from the reference calculated values, and to control the bias electrical current applied to the light source to make the first calculated value equal to the second calculated value.

Advantages of the Invention

An optical fiber temperature sensing device can be provided that can keep the output of the LD constant without complicating the construction and increasing the manufacturing cost so as to raise the precision of temperature measurement thereof.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
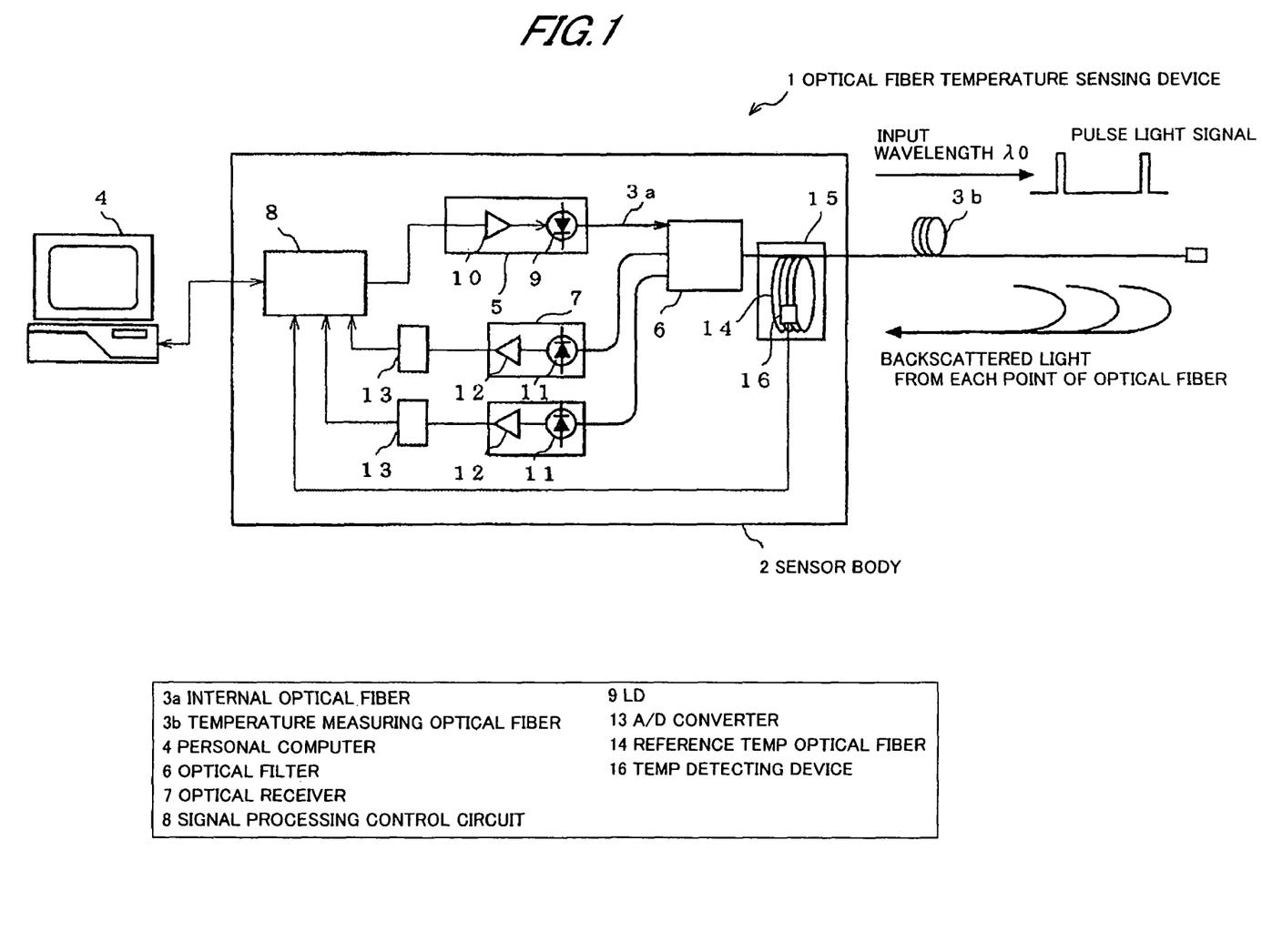
FIG. 1 is a block diagram showing an optical fiber temperature sensing device in a preferred embodiment according to the invention.

FIG. 1 is a block diagram showing an optical fiber temperature sensing device in a preferred embodiment according to the invention.

As shown in FIG. 1, an optical fiber temperature sensing device 1 with APC (Automatic Power Control) control function and/or malfunction detecting function in the preferred embodiment comprises a sensor body 2, a temperature measuring optical fiber 3b disposed outside the sensor body and extended to a temperature measurement site, and a display/control personal computer 4 as an external arithmetic processing unit to control a controlling means in the sensor body 2 as described later and to display the temperature of a measurement site.

The sensor body 2 mainly comprises an LD module 5 as a light source to emit a pulse light signal of wavelength $\lambda_0$, an optical filter 6 to transmit the pulse light signal and to separate the St light and the As light from the backscattered light, optical receivers 7 to receive the St light and the As light, respectively, and to convert the received light into electrical signal, and a signal processing control circuit 8 as a controller.

The LD module 5 comprises an LD 9 and a driver 10 to drive the LD 9. The optical filter 6 comprises, for example, a filter to transmit only the St light and a filter to transmit only the As light which are disposed opposite to each other and each inclined at a certain angle. The optical receiver 7 comprises APD (avalanche photodiode) 11 and a preamplifier 12 to amplify the output of APD 11. Further, A/D (analog-digital) converters 13 are each connected between the optical receiver 7 and the signal processing control circuit 8.

The optical fiber temperature sensing device 1 has a structure that the LD module 5 and the optical filter 6 are connected through the internal optical fiber 3a, and the optical filter 6 and the temperature measuring optical fiber 3b are connected through an optical fiber (other than the temperature measuring optical fiber 3b) which is used as a reference temperature optical fiber 14 whose temperature is known. Alternatively, a surplus length portion of the temperature measuring optical fiber 3b may be directly connected to the optical filter 6, and the surplus length portion of the temperature measuring optical fiber 3b may be used as a reference temperature optical fiber.

The signal processing control circuit 8 has a function to monitor the St light intensity and the As light intensity scattered from the reference temperature optical fiber 14 to control the output of the LD based on the St light intensity and the As light intensity, and to detect the malfunction of the optical fiber temperature sensing device 1 itself. Further, the reference temperature optical fiber 14 can have only a function to control the output of the LD, or only a function to detect the malfunction of the optical fiber temperature sensing device 1 itself.

The signal processing control circuit 8, in more detail, for example, calculates a value (e.g., by using four arithmetic operations of addition, subtraction, multiplication and division) from the St light intensity and the As light intensity scattered of backscattered light from the reference temperature optical fiber 14, and to control a bias electrical current to be applied to the LD 9 based on the calculated value. Thus, the signal processing control circuit 8 can control the output of the LD 9 to be constant even when temperature change in the optical fiber temperature sensing device 1 is caused.

The signal processing control circuit 8 comprises, for example, MCU (Micro Controller Unit) as a memory unit and FPGA (Field Programmable Gate Array) as an arithmetic processing unit. For example, the MCU may store various data (e.g., values of four arithmetic operations of addition, subtraction, multiplication and division as described later) relating to temperature measurement.

The signal processing control circuit 8 has a similar temperature measurement function to that of the signal processing control circuit 33 of the conventional optical fiber temperature sensing device 31 as shown in FIG. 3. The detailed operation of the signal processing control circuit 8 will be described later.

The reference temperature optical fiber 14 is housed in a fiber housing box 15. The sensor body 2 comprises a temperature detecting device 16 to detect the temperature of reference temperature optical fiber 14. The temperature detecting device 16 is connected to the signal processing control circuit 8. The temperature detecting device 16 is preferably a thermocouple or an IC for temperature measurement.

The operation of the optical fiber temperature sensing device 1 will be explained below.

APC Control

The signal processing control circuit 8 generates a pulse light signal, the pulse signal is converted into a pulse light signal (with an output wavelength $\lambda_0$) by the LD module 5, and the pulse light signal is inputted through the optical filter 6 to the reference temperature optical fiber 14. Hereupon, backscattered light is generated from the reference temperature optical fiber 14.

Then, the backscattered light is separated into the St light with a wavelength of $\lambda S_t$ and the As light with a wavelength of $\lambda A_s$ by the optical filter 6, and the separated lights are each received by the optical receivers 7, converted into electrical signals, and inputted to the signal processing control circuit 8.

If the internal temperature of the optical fiber temperature sensing device 1 changes, the temperature of the reference temperature optical fiber 14 also changes to cause a change in the St light intensity and the As light intensity. To cope with this, temperature compensation for the light intensity (i.e., APC control) and the malfunction detection of the device 1 are conducted as follows.

(1) Case of Using Approximation Formula

Figure 2:
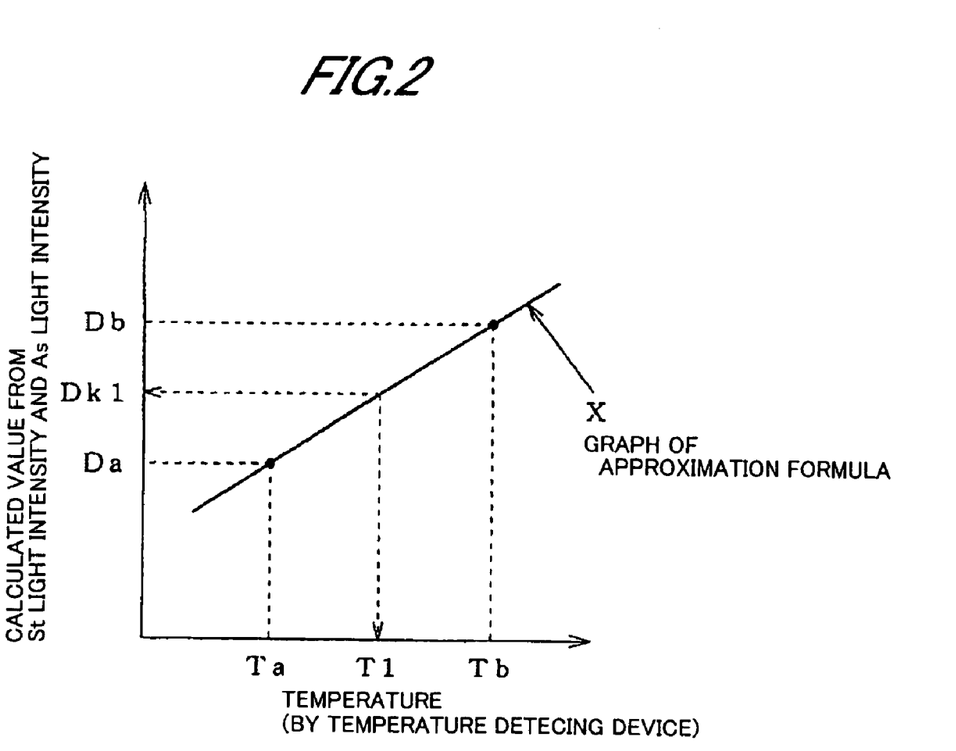
FIG. 2 is a graph showing an APC control/malfunction detecting operation by using an approximation formula in the optical fiber temperature sensing device shown in FIG. 1.

Prior to actual temperature measurement, as shown in FIG. 2, at first, the signal processing control circuit 8 measures the St light intensity and the As light intensity of backscattered light scattered from the reference temperature optical fiber 14 for two arbitrary temperatures (i.e., temperatures at predetermined observational points or known temperatures) Ta, Tb of the reference temperature optical fiber 14. Then, an arithmetic processing is conducted to obtain data (i.e., a calculated value), and the data is stored in MCU as a reference calculated value. The two arbitrary temperatures are measured by the temperature detecting device 16 placed in the sensor body 2.

The signal processing control circuit 8 produces an approximation formula on a relationship between the temperatures Ta, Tb and the calculated values Da, Db which are each obtained from the St light intensity and the As light intensity at each of the temperatures, whereby a graph X of the approximation formula as shown in FIG. 2 is obtained. The graph X of the approximation formula is stored in the arithmetic processing unit or the memory unit by the signal processing control circuit 8.

For example, the graph X of the approximation formula stored can include a graph showing a relationship between temperature and (ST0+AS0) produced by an approximation formula obtained from the sum (ST0+AS0) of St light intensity ST0 and the As light intensity AS0 at ambient temperatures, e.g., 25° C., 30° C., . . . .

Based on the graph X of the approximation formula, a calculated value (i.e., an interpolated or extrapolated value calculated by the formula) can be obtained from the St light intensity and the As light intensity of backscattered light generated in the reference temperature optical fiber 14 at temperature other than the temperatures previously measured (Procedure 1).

The graph X of the approximation formula can be also obtained from (ST0+AS0) at one ambient temperature. This is because a graph showing a relationship between (ST0+AS0) and temperature is almost predictable from the commonly-used art except a case that the graph may significantly vary depending on the wavelength of LD 9.

The APC control and the malfunction detection of the optical fiber temperature sensing device 1 will be conducted as follows.

When the data until Procedure 1 is prepared, the signal processing control circuit 8 produces a calculated value (defined as D1) from the St light intensity and As light intensity of backscattered light generated in the reference temperature optical fiber 14 at another temperature (defined as T1, i.e., a temperature at the time when conducting the APC control or the malfunction detection of the optical fiber temperature sensing device 1) detected by the temperature detecting device 16.

On the other hand, the signal processing control circuit 8 produces a calculated value Dk1 from the St light intensity and the As light intensity at the temperature T1 based on the approximation formula. The calculated value D1 is compared to the calculated value Dk0 based on the approximation formula, and the bias electrical current of the driver 10 or the LD 9 is controlled to make the calculated value D1 equal to Dk1 to keep the output of LD 9 constant.

The approximation formula is used in the APC control by the signal processing control circuit 8 so as to decrease the number of measurements to be previously conducted. The approximation formula as shown in FIG. 2 can be obtained from the two arbitrary temperatures Ta, Tb and the calculated values Da, Db from the St light intensity and the As light intensity of backscattered light generated in the reference temperature optical fiber 14 at the temperatures.

Furthermore, when the variation of (ST0+AS0) exceeds a predetermined value, the signal processing control circuit 8 generates a warning signal and sends it to the personal computer 4. Thus, the optical fiber temperature sensing device 1 can detect whether the LD 9, i.e., the LD module 5 operates normally or not. Namely, the malfunction detection of the optical fiber temperature sensing device 1 can be conducted as exemplified by the malfunction detection of the LD module 5.

The reference temperature optical fiber 14 is housed in the sensor body 2, and the LD 9 is also housed in the sensor body 2. Therefore, as the temperature of the reference temperature optical fiber 14 changes, the temperature of the sensor body 2 changes simultaneously. Thus, the temperature of LD 9 also changes according to the reference temperature optical fiber 14. As such, it is necessary that the signal processing control circuit 8 controls, as described above, the bias electrical current of the LD 9 to keep the output of LD 9 constant when the temperature of the LD 9 changes.

(2) Case of Using a Number of Predicted Data

Alternatively, instead of using the approximation formula, the signal processing control circuit 8 may be operated such that it previously measures the St light intensity and the As light intensity of backscattered light generated in the reference temperature optical fiber 14 at a number of temperature points to obtain data, and stores the data as reference calculated values in the MCU.

The data stored are used to produce a graph showing a relationship between the temperatures and the sum (ST0+AS0) of the St light intensity ST0 and the As light intensity AS0 at each ambient temperature of, e.g., −30° C. to +70° C.

The previous measurement at a number of temperature points can be adequately conducted by calculating the reference calculated values of the St light intensity and the As light intensity of backscattered light generated in the reference temperature optical fiber 14 in units of 1° C. (i.e., in increments of 1° C.), and storing them in the memory unit. This is because the measurement accuracy of the temperature detecting device 16 is only 1° C. or so.

In this case, the signal processing control circuit 8 compares the data previously calculated with data such as (ST1+AS1) obtained by temperature measurement at a measurement site, and controls the bias electrical current of the driver 10 or the LD 9 to make the temperature measurement data equal to the previously calculated data to keep the output of LD 9 constant.

The above method of using a number of predicted data causes an increase in number of measurements compared to the method of using the approximation formula as described earlier. However, the former has advantages that the APC control and the malfunction detection of the optical fiber temperature sensing device 1 can be performed with high accuracy, and error in measurement can be reduced. This is because the graph showing the relationship between the temperature and the calculated value of the St light intensity and the As light intensity is provided with a curved line.

Temperature Measurement

The temperature measurement is conducted at a measurement site while the APC control as described above is conducted at intervals of predetermined time. The predetermined time can be determined arbitrarily.

The signal processing control circuit 8 calculates the intensity ratio of St light to As light from each point of the temperature measuring optical fiber 3b at intervals of a sampling time by the same way as the APC control, and determines temperature at the measurement site based on the calculated intensity ratio. The interval of the sampling time varies depending on the times of addition. The temperature determined is displayed on the personal computer 4.

However, since the St light and the As light are very weak, the temperature measurement is repeated such that data obtained is added to the previous data and temperature is determined by using the addition result to obtain a temperature result at each point.

Thus, the optical fiber temperature sensing device 1 applies the APC control to the LD 9 while using the signal, which is inputted to the signal processing control circuit 8, of the St light and the As light of backscattered light generated in the reference temperature optical fiber 14 for known temperature.

Therefore, the optical fiber temperature sensing device 1 can detect whether the LD 9, i.e., the LD module 5 operates normally or not even when the LD 9 is not provided with the monitor PD or the peltiert device. Thus, the optical fiber temperature sensing device 1 can keep the output of LD 9 constant to determine the temperature at a measurement site with high accuracy.

Since the optical fiber temperature sensing device 1 does not need the LD module 5 with the monitor PD, the optical fiber temperature sensing device 1 can use the LD module 5 with a lower cost than the conventional one. Therefore, the whole cost of the optical fiber temperature sensing device 1 can be reduced.

Further, since the LD module 5 has a simpler structure than the conventional LD module 34, the whole structure of the optical fiber temperature sensing device 1 can be further simplified.

Furthermore, since the signal processing control circuit 8 only has to process two signals of the St light and As light in its temperature calculation processing, the structure of circuit 8 can be further simplified in comparison with the conventional one.

Although in the above embodiment, addition value is used as a calculated value of St light intensity and As light intensity, the other value of the four arithmetic operations such as subtraction, multiplication and division may be also used for the calculated value.

For example, in case of using the subtraction, the signal processing control circuit 8 controls the bias electrical current applied to the LD 9 such that the difference (ST0−AS0) between the reference intensity ST0 and the reference intensity AS0 of St light and As light, respectively, of backscattered light generated in the reference temperature optical fiber 14 is made to be equal to a difference (ST0−AS0) at a certain temperature of the reference temperature optical fiber 14, which is previously measured and stored in the MCU.

In case of using the multiplication, the signal processing control circuit 8 controls the bias electrical current applied to the LD 9 such that the product (ST0×AS0) between the reference intensity ST0 and the reference intensity AS0 of St light and As light, respectively, of backscattered light generated in the reference temperature optical fiber 14 is made to be equal to a product (ST0×AS0) at a certain temperature of the reference temperature optical fiber 14, which is previously measured and stored in the MCU.

In case of using the division, the signal processing control circuit 8 controls the bias electrical current applied to the LD 9 such that the quotient (ST0÷AS0) between the reference intensity ST0 and the reference intensity AS0 of St light and As light, respectively, of backscattered light generated in the reference temperature optical fiber 14 is made to be equal to a quotient (ST0÷AS0) at a certain temperature of the reference temperature optical fiber 14, which is previously measured and stored in the MCU.

In these cases, the same functions and effects as the above-mentioned embodiment can be obtained.

Further, a combination of two or more of sum, difference, product and quotient can be used as the calculated value of St light intensity and As light intensity. For example, (ST0× AS0)×(ST0÷AS0) may be used.

Although in the above embodiment, the malfunction detection of the LD module 5 is explained as an example of malfunction detection of the optical fiber temperature sensing device 1 by the signal processing control circuit 8, the signal processing control circuit 8 can also detect the breaking of the internal optical fiber 3a and the temperature measuring optical fiber 3b.

In this case, if there is a breaking site on the internal optical fiber 3a or the temperature measuring optical fiber 3b, reflected light (with the same wavelength as incident light) due to Fresnel reflection is generated at the breaking site. The signal processing control circuit 8 monitors the intensity of the reflected light, whereby the breaking and the breaking site of the internal optical fiber 3a and the temperature measuring optical fiber 3b can be detected since the calculated value as described above shows an abnormal value.

In the above embodiment, the optical fiber temperature sensing device 1 is provided with the reference temperature optical fiber 14, and the signal processing control circuit 8 monitors St light intensity and As light intensity of backscattered light generated in the reference temperature optical fiber 14, controls the output of the light source, and detects the malfunction of the optical fiber temperature sensing device 1.

In another embodiment, the reference temperature optical fiber 14 may be omitted from the optical fiber temperature sensing device 1, and the signal processing control circuit 8 may monitor the St light intensity and As light intensity of backscattered light generated in the temperature measuring optical fiber 3b to control the output of the light source or to detect the malfunction of device. Furthermore, in the above operation of the optical fiber temperature sensing device 1, the temperature measuring optical fiber 3b can be used in place of the reference temperature optical fiber 14. In this case, the same functions and effects as the optical fiber temperature sensing device 1 can be also obtained.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber temperature sensing device, comprising:
a sensor body;
a light source housed in the sensor body;
a temperature measuring optical fiber disposed outside the sensor body and extended to a temperature measurement site, wherein, when a light is emitted from the light source into the temperature measuring optical fiber, Stokes light intensity and anti-Stokes light intensity of backscattered light generated in the temperature measuring optical fiber are detected to determine a temperature at the temperature measurement site;
a reference temperature optical fiber disposed inside the sensor body; and
a controller that is operable to control an output of the light source by monitoring Stokes light intensity and anti-Stokes light intensity of backscattered light generated in the reference temperature optical fiber,
wherein:
the controller is operable to previously determine reference calculated values from Stokes light intensity and anti-Stokes light intensity of backscattered light generated in the reference temperature optical fiber at least at two arbitrary temperatures, to determine an approximation formula representing a relationship between the reference calculated values and the two arbitrary temperatures, to store the approximation formula in a memory device, to determine a first calculated value from Stokes light intensity and anti-Stokes light intensity of backscattered light generated in the reference temperature optical fiber at an other temperature, to determine a second calculated value at the other temperature by using the approximation formula, and to control a bias electrical current applied to the light source to make the first calculated value equal to the second calculated value.

2. The optical fiber temperature sensing device according to claim 1, wherein:
the controller is operable to detect a malfunction of the device.

3. The optical fiber temperature sensing device according to claim 1, wherein:
the controller is operable to detect a malfunction of the light source.

4. An optical fiber temperature sensing device, comprising:
a sensor body;
a light source housed in the sensor body;
a temperature measuring optical fiber disposed outside the sensor body and extended to a temperature measurement site, wherein, when a light is emitted from the light source into the temperature measuring optical fiber, Stokes light intensity and anti-Stokes light intensity of backscattered light generated in the temperature measuring optical fiber are detected to determine a temperature at the temperature measurement site;
a reference temperature optical fiber disposed inside the sensor body; and
a controller that is operable to control an output of the light source by monitoring Stokes light intensity and anti-Stokes light intensity of backscattered light generated in the reference temperature optical fiber,
wherein:
the controller is operable to previously determine reference calculated values from Stokes light intensity and anti-Stokes light intensity of backscattered light generated in the reference temperature optical fiber at plural temperatures, to store the reference calculated values into a memory device, to determine a first calculated value from Stokes light intensity and anti-Stokes light intensity of backscattered light generated in the reference temperature optical fiber at an arbitrary temperature, to output a second calculated value at the arbitrary temperature from the reference calculated values, and to control a bias electrical current applied to the light source to make the first calculated value equal to the second calculated value.

5. The optical fiber temperature sensing device according to claim 4, wherein:
the controller is operable to detect a malfunction of the device.

6. The optical fiber temperature sensing device according to claim 4, wherein:

the controller is operable to detect a malfunction of the light source.

7. An optical fiber temperature sensing device, comprising:

a sensor body;

a light source housed in the sensor body;

an optical fiber disposed from an inside of the sensor body to a temperature measurement site, to measure a temperature at the temperature measurement site by detecting Stokes light intensity and anti-Stokes light intensity of backscattered light generated in the optical fiber when a light is emitted from the light source into the optical fiber; and a controller to control an output of the light source by monitoring Stokes light intensity and anti-Stokes light intensity of backscattered light generated in the optical fiber, wherein:

the controller is operable to previously determine reference calculated values from Stokes light intensity and anti-Stokes light intensity of backscattered light generated in a reference temperature optical fiber at least at two arbitrary temperatures, to determine an approximation formula representing a relationship between the reference calculated values and the two arbitrary temperatures, to store the approximation formula in a memory device, to determine a first calculated value from Stokes light intensity and anti-Stokes light intensity of backscattered light generated in the reference temperature optical fiber at an other temperature, to determine a second calculated value at the other temperature by using the approximation formula, and to control a bias electrical current applied to the light source to make the first calculated value equal to the second calculated value.

8. The optical fiber temperature sensing device according to claim 7, wherein:

the controller is operable to detect a malfunction of the device.

9. The optical fiber temperature sensing device according to claim 7, wherein:

the controller is operable to detect a malfunction of the light source.

10. Optical fiber temperature sensing, comprising:

a sensor body;

a light source housed in the sensor body;

an optical fiber disposed from an inside of the sensor body to a temperature measurement site, to measure a temperature at the temperature measurement site by detecting Stokes light intensity and anti-Stokes light intensity of backscattered light generated in the optical fiber when a light is emitted from the light source into the optical fiber; and a controller to control an output of the light source by monitoring Stokes light intensity and anti-Stokes light intensity of backscattered light generated in the optical fiber, wherein:

the controller is operable to previously determine reference calculated values from Stokes light intensity and anti-Stokes light intensity of backscattered light generated in a reference temperature optical fiber at plural temperatures, to store the reference calculated values into a memory device, to determine a first calculated value from Stokes light intensity and anti-Stokes light intensity of backscattered light generated in the reference temperature optical fiber at an arbitrary temperature, to output a second calculated value at the arbitrary temperature from the reference calculated values, and to control a bias electrical current applied to the light source to make the first calculated value equal to the second calculated value.

11. The optical fiber temperature sensing device according to claim 10, wherein:

the controller is operable to detect a malfunction of the device.

12. The optical fiber temperature sensing device according to claim 10, wherein:

the controller is operable to detect a malfunction of the light source.

* * * * *